(12) United States Patent
Pinlam et al.

(10) Patent No.: US 6,390,314 B1
(45) Date of Patent: May 21, 2002

(54) AUTOMATIC TROLLEY CLAMP LOCK

(75) Inventors: Watcharin Pinlam, Pathumthanee;
Chalor Moogdaharn, Nakornsawan;
Youthachai Bupparit, Nonthaburi, all of (TH)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/729,514

(22) Filed: Dec. 4, 2000

(51) Int. Cl.[7] ................................................ B61G 5/00
(52) U.S. Cl. ........................ 213/75 R; 213/78; 213/88; 213/212; 280/514; 280/509
(58) Field of Search .......................... 104/88.03, 88.04, 104/88.06; 213/75 R, 211, 212, 75 D, 78, 88; 280/514, 504, 508, 509, 510; 105/3, 4.1

(56) References Cited

U.S. PATENT DOCUMENTS

| | | | | |
|---|---|---|---|---|
| 3,450,272 A | * | 6/1969 | Munzing | ................ 213/75 TC |
| 3,659,725 A | * | 5/1972 | Passalacqua | ............ 213/75 TC |
| 3,724,680 A | * | 4/1973 | Hines | ......................... 213/212 |
| 3,837,316 A | * | 9/1974 | Stratienko et al. | ........... 114/235 |
| 4,794,867 A | * | 1/1989 | Titz | ................................ 105/3 |
| 5,014,864 A | * | 5/1991 | Richter et al. | ............... 213/104 |
| 5,525,884 A | | 6/1996 | Sugiura et al. | |
| 5,580,076 A | * | 12/1996 | DeRoule et al. | ......... 280/406.2 |
| 5,917,774 A | * | 6/1999 | Walkow et al. | ................ 367/25 |

FOREIGN PATENT DOCUMENTS

EP 0235094 A1 * 2/1987

* cited by examiner

Primary Examiner—S. Joseph Morano
Assistant Examiner—Frantz F. Jules
(74) Attorney, Agent, or Firm—Amin & Turocy, LLP

(57) ABSTRACT

The present invention provides systems and methods that reduce the number of mis-routed trolleys in an AGV system. The invention provides a solenoid driven automatic coupling for coupling a trolley to an AGV. When an AGV arrives at a particular preprogrammed destination, as determined for example by track patches read by the AGV, the AGV system switches the solenoid power causing the automatic coupling to free the trolley to disengage from the AGV. The AGV may then pull away from the trolley, leaving the trolley at its programmed destination. The system substantially eliminates the risk of a trolley not being uncoupled prior to the AGV's departing from the trolley's intended destination.

17 Claims, 7 Drawing Sheets

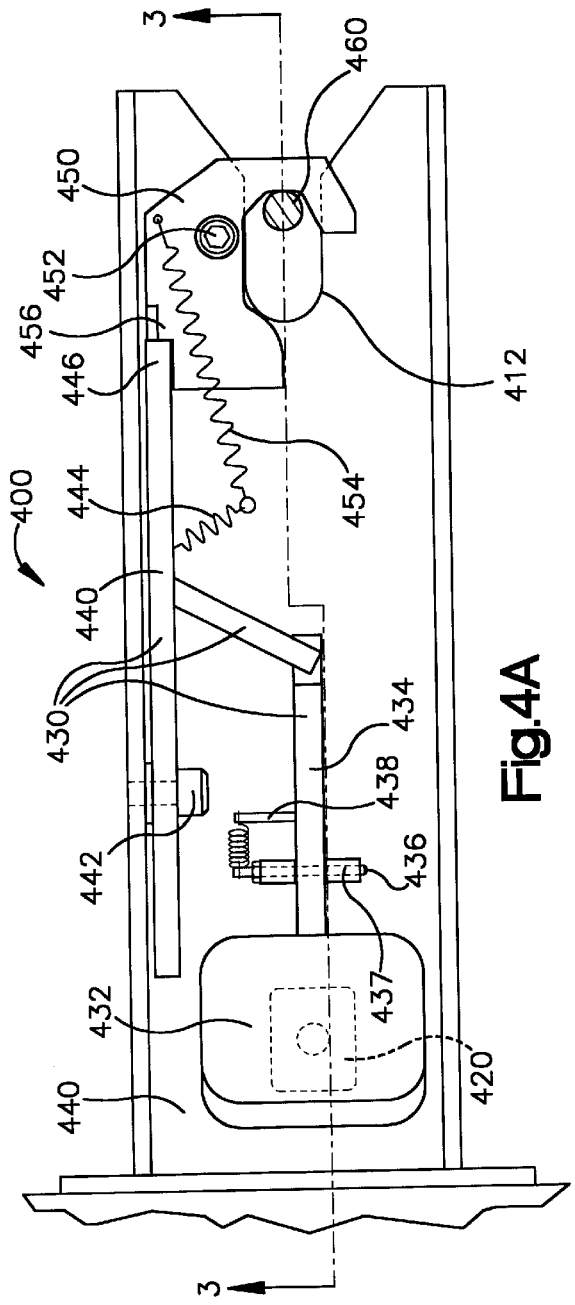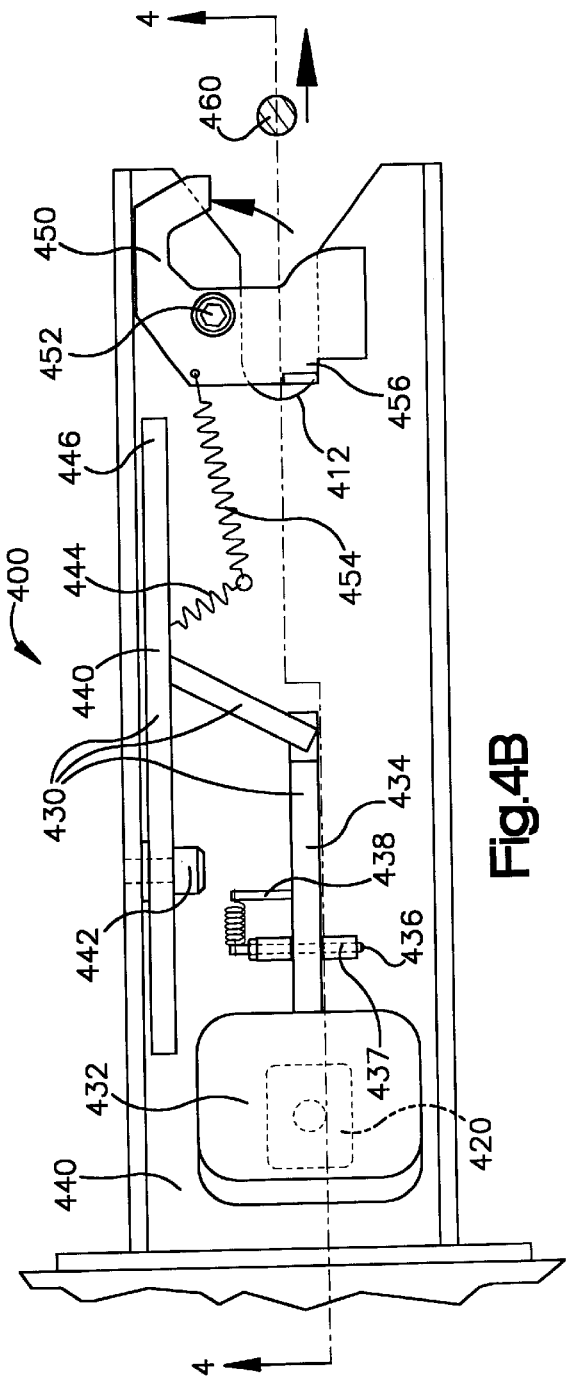

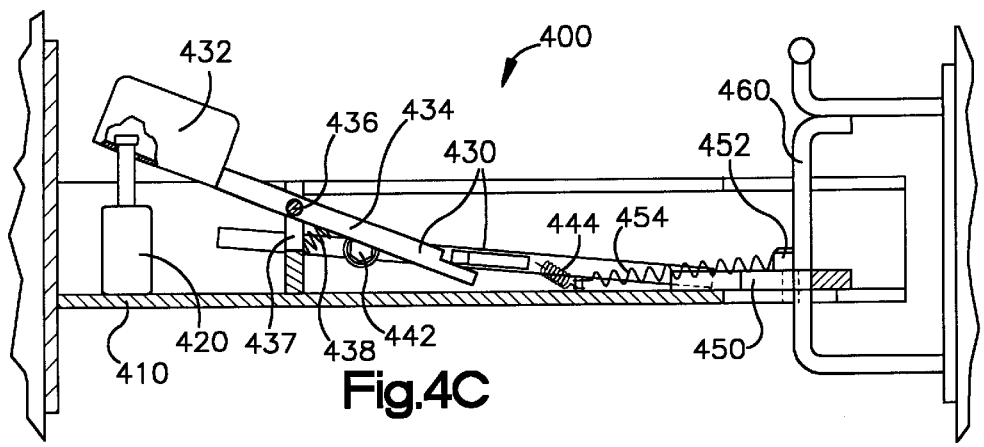
Fig.4C
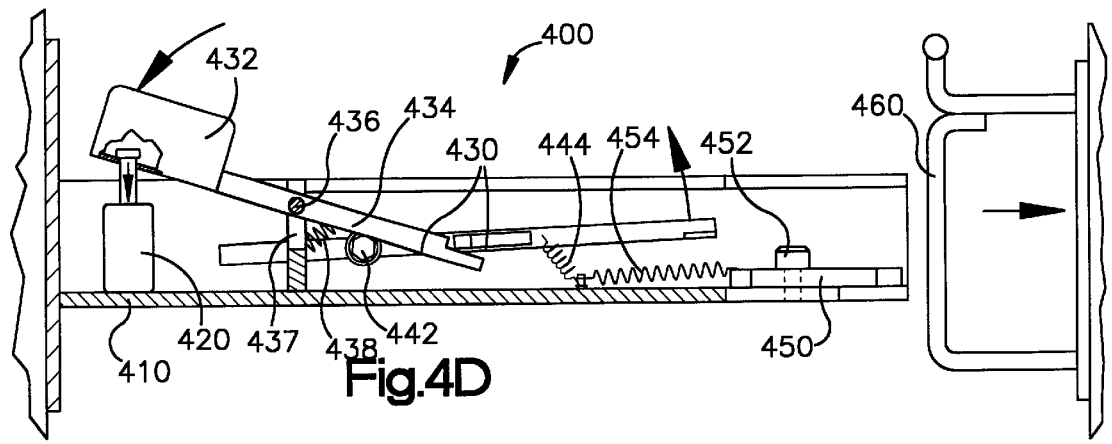
Fig.4D
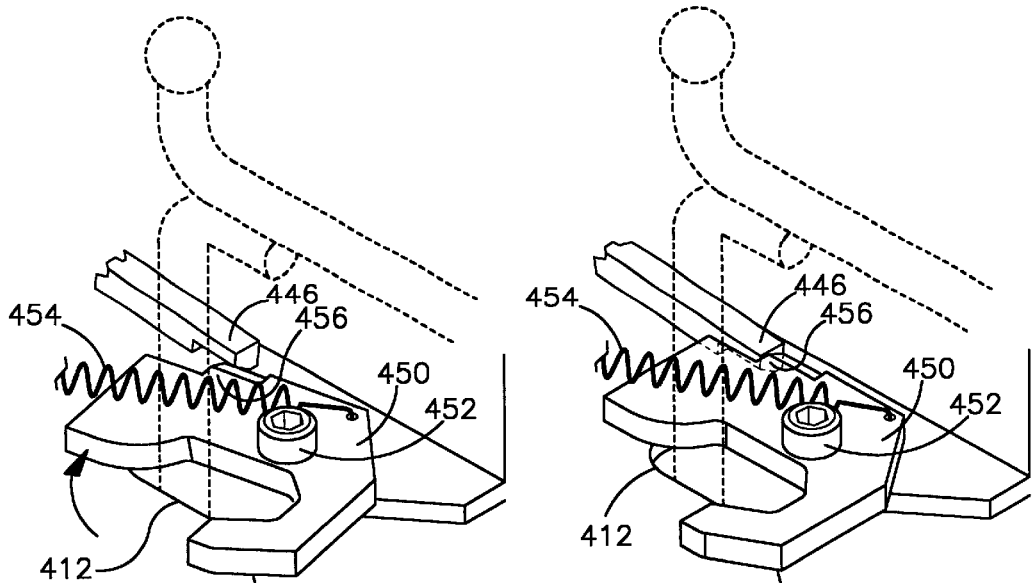
Fig.5
Fig.6

AUTOMATIC TROLLEY CLAMP LOCK

TECHNICAL FIELD

The present invention generally relates to automated guided vehicle systems, and in particular relates to a system for automatically uncoupling trolleys.

BACKGROUND OF THE INVENTION

Automatic guided vehicles (AGV) are widely used in a variety of industrial environments, including factories and hospitals. They move automatically from one location to another, generally following a guide wire or track. They are intended to efficiently transport materials from location to location without requiring a vehicle driver.

AGV's generally pull carriers, referred to as trolleys, on which goods to be transported are placed. Trolleys are attached to the AGV, usually at the back, by couplings. When an AGV arrives at a preprogrammed destination, an operator is responsible for decoupling any trolleys that have reached their destination.

Generally, AGV's are programmed to stop at particular destinations for short periods of time. In most instances, an AGV is programmed to stop for about 1 to 4 minutes. Short waiting periods increase transport system efficiency. However, if an operator fails to meet the AGV while the AGV is stopped and waiting, the AGV continues on to the next destination with the trolley still attached. When this happens, the AGV needs to be rerouted (reprogrammed) through the facility, which diminishes the AGV system's productivity and worker efficiency. There is an unsatisfied need for more efficient AGV systems.

SUMMARY OF THE INVENTION

The present invention provides systems and methods that reduce the number of mis-routed trolleys in an AGV system. The invention provides a solenoid driven automatic coupling for coupling a trolley to an AGV. When an AGV arrives at a particular preprogrammed destination, as determined for example by track patches read by the AGV, the AGV system switches the solenoid power causing the automatic coupling to free the trolley to disengage from the AGV. The AGV may then pull away from the trolley, leaving the trolley at its programmed destination. The system substantially eliminates the risk of a trolley not being uncoupled prior to the AGV's departing from the trolley's intended destination.

One aspect of the invention provides a coupling system adapted to couple an automatic guided vehicle to a trolley including an engagement member and a keeper, the engagement member moveable between an engaging position for engaging the keeper in an interference fit and a disengaging position for releasing the keeper from the interference fit, an actuator, which may be the same structure as the engagement member, moveable between a locking position and an unlocking position, a solenoid acting against the actuator according to a control current, and a controller for switching the control current, wherein switching the control current causes the actuator to move from the locking to the unlocking position, in the locking position, the engagement member is restricted from moving from the engaging position to the disengaging position, and in the unlocking position, the engagement member is either in the disengaging position or is free to move to the disengaging position.

Another aspect of the invention provides an automatic guided vehicle including a body and a coupling including a solenoid, the coupling being attached to the body and adapted to engage the automatic guided vehicle with a trolley, wherein switching a control current to the solenoid permits a trolley engaged by the coupling to the automatic guided vehicle to be disengaged from the automatic guided vehicle.

A further aspect of the invention provides a method for automatically disengaging a trolley from an automatic guided vehicle including providing an automatic guided vehicle with a coupling and a system for automatically disengaging the coupling and configuring the system to disengage the trolley according to a programmed location.

A further aspect of the invention provides an automatic guided vehicle including means for coupling the automatic guided vehicle to a trolley and means for automatically disengaging the trolley from the automatic guided vehicle.

A further aspect of the invention provides an automatic guided vehicle system including a plurality of automatic guided vehicles, a plurality of trolleys, and automatically operable couplings for engaging the automatic guided vehicles to the trolleys, wherein the automatically operable couplings release the trolleys according to location of the automatic guided vehicles.

The invention extends to features hereinafter fully described and particularly pointed out in the claims. The following description and the annexed drawings set forth in detail certain illustrative examples of the invention. These examples are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 4a is a top view illustration of a coupling according to one aspect of the present invention with the actuator in the locking position and the keeper in the engaging position.

FIG. 4b is a top view illustration of a coupling according to one aspect of the present invention with the actuator in the unlocking position and the keeper in the disengaging position.

FIG. 4c is a side view illustration along line 3 of FIG. 4a.

FIG. 4d is a side view illustration along line 4 of FIG. 4b.

FIG. 5 is an oblique view illustration of a coupling according to one aspect of the present invention with the actuator in the locking position and the keeper moving into the engaging position.

FIG. 6 is an oblique view illustration of a coupling according to one aspect of the present invention with the actuator in the locking position and the keeper in the engaging position.

DETAILED DESCRIPTION OF THE INVENTION

Figure 1:
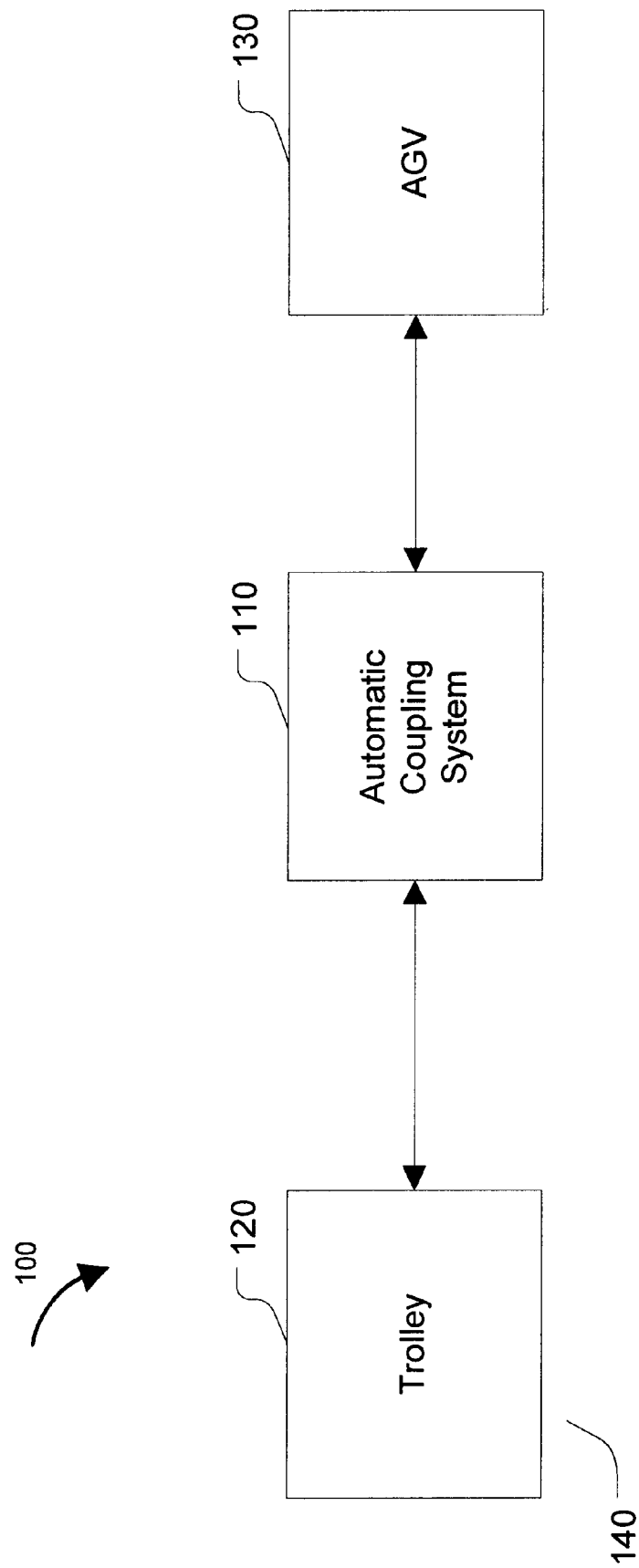
FIG. 1 is a high level schematic of an AGV system according to one aspect of the present invention.

FIG. 1 is a high level schematic of an automatic guided vehicle (AGV) system 100 provided by one aspect of the invention. AGV system 100 includes coupling system 110, which is adapted to couple AGV 130 to trolley 120. Coupling system 110 includes a solenoid that actuates to disengage trolley 120 according to a control current. Coupling system 110 allows AGV 130 of AGV system 100 to pull trolley 120 and release it automatically upon arriving at a destination.

Figure 2:
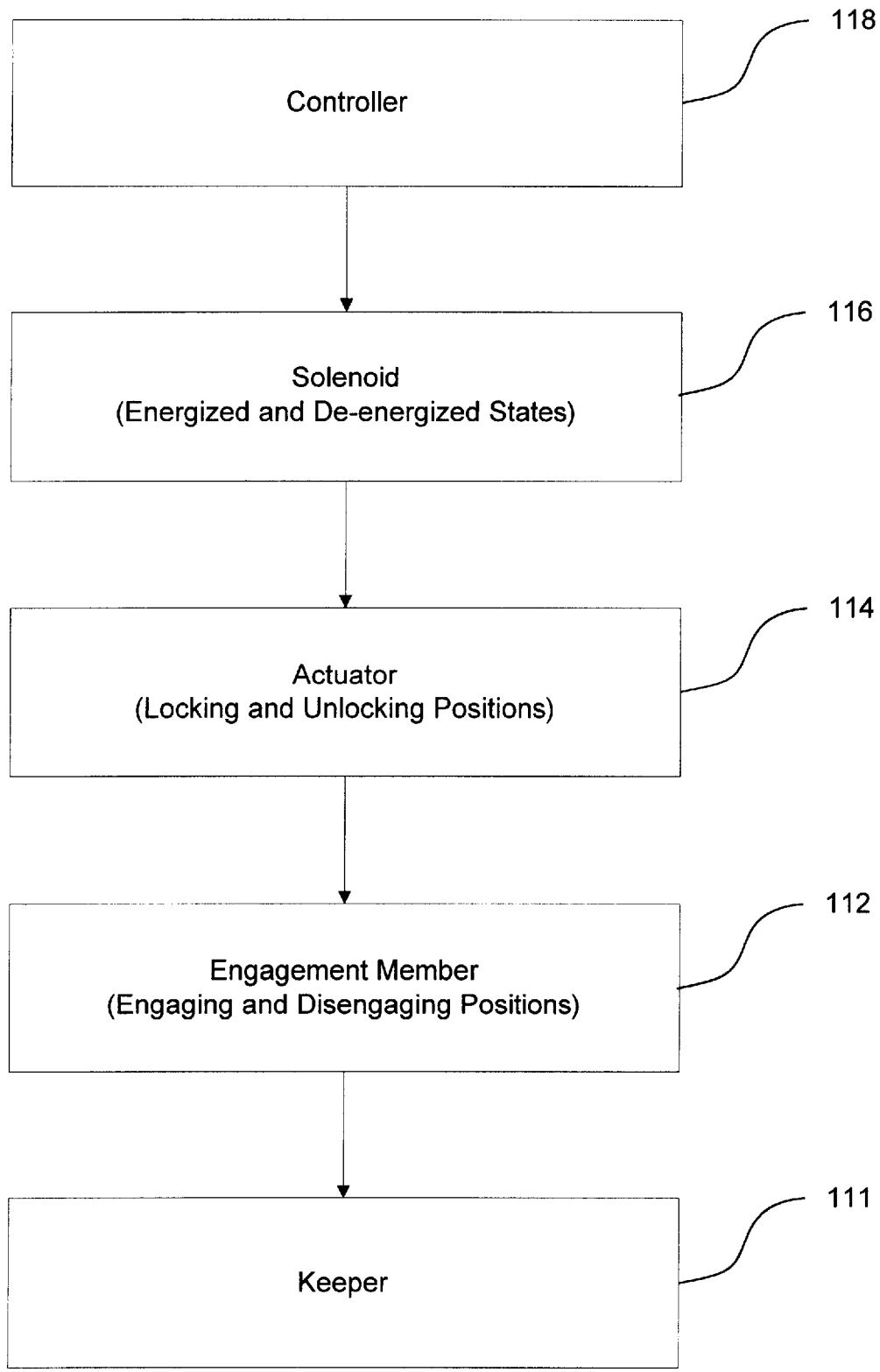
FIG. 2 is a high level schematic of a coupling system according to another aspect of the present invention.

Coupling system 110 is illustrated schematically in FIG. 2. Coupling system 110 includes engagement member 112, actuator 114, solenoid 116, controller 118, and keeper 111. Engagement member 112 moves to engage keeper 111 in an interference fit. Actuator 114 moves to lock the engagement. Controller 118 operates to switch the power to solenoid 116. When the power to solenoid 116 is switched, actuator 114 is moved to release the lock, whereupon engagement member 112 and keeper 111 may be disengaged.

Figure 3:
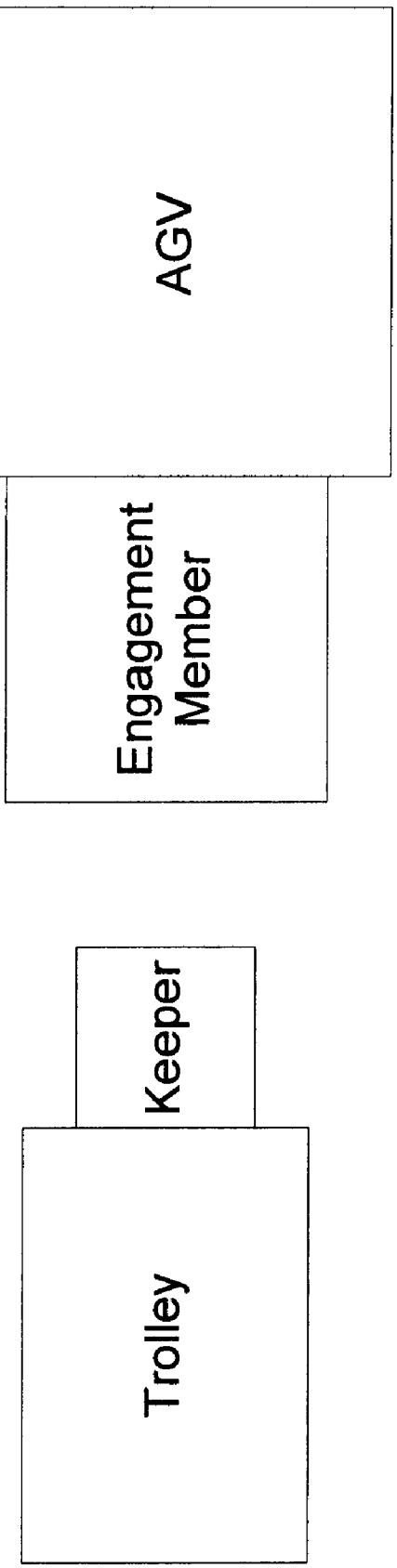
FIG. 3 is a high level schematic of an AGV system according to a further aspect of the present invention.

Engagement member 112 is moveable between an engaging and a disengaging position. In the engaged position, engagement member 112 forms an interference fit with keeper 111. In the disengaging position, keeper 111 may be pulled away from engagement member 112. Engagement member 112 may be a hook, a latch, a clamp, or any other structure suitable for forming an interference fit with a keeper. Keeper 111 is generally a stationary structure, but it may be a structure that moves as long as it permits engagement member 112 to disengage from keeper 111 when engagement member 112 is in the disengaging position. The interference fit creates a coupling between an AGV and a trolley such that the AGV may pull the trolley along the track. In one aspect of the invention, schematically illustrated in FIG. 3, the engagement member is attached to an AGV and the keeper is attached to a trolley. In another aspect of the invention, the engagement member is attached to a trolley and the keeper is attached to an AGV.

Actuator 114 is moveable between a locking position and an unlocking position. When actuator 114 is in the locking position, engagement member 112 is prevented from moving from the engaging position to the disengaging position. When actuator 114 is moved to the unlocking position, engagement member 112 either moves to the disengaging position or is made free to move to the disengaging position. Optionally, actuator 114 and engagement member 112 are combined in a single part, in which case, engagement member 112 necessarily moves to the disengaging position when actuator 114 moves to the unlocking position. Actuator 114 and engagement member 112 are generally attached to a single frame, which is attached to either and AGV or a trolley.

When solenoid 116 is energized, it acts against actuator 114. Switching the power to solenoid 116 causes actuator 114 to move to the unlocking position. In one aspect of the invention, solenoid 116, when energized, holds actuator 114 in the locking position, and when solenoid 116 is de-energized, a biasing force, a spring for example, moves actuator 114 to the unlocking position. In another aspect of the invention, solenoid 116 when energized move the actuator to the unlocking position. An advantage of this latter configuration is that there is less risk of disengagement due to accidental loss of power to solenoid 116. The risk of accidental disengagement is further reduced by providing a biasing force, such as a spring, to bias actuator 114 toward the locking position.

Solenoid 116 may be any device with an electromagnetically moveable member. Generally, solenoid 116 includes a coil of wire that when carrying a current act as a magnet so that a moveable core is drawn into, or pushed out of, the coil. The moveable core acts against actuator 114 when solenoid 116 is energized.

Solenoid 116 is generally attached to a frame along with actuator 114 and engagement member 112. Where the frame is attached to AGV 130, the control current for solenoid 116 is generally supplied by AGV 130. A wire from AGV 130 to the solenoid 116 can be used to carry the control current. Where the frame is attached to trolley 120, the control current is supplied either by trolley 120 or to trolley 120. Trolley 120 may carry batteries to supply the power. Alternatively, the control current may be supplied via coupling system 110, the power source being carried on, for example, AGV 130 to which trolley 120 is coupled. In other words, engagement member 112 and keeper 111 may form electrical connections in their engaged positions and the current thus carried may be used to energize solenoid 116 when solenoid 116 is carried by trolley 120.

The control current for solenoid 116 is switched by controller 118. Controller 118 is generally mounted on AGV 130 and may be a controller for AGV 130. Alternatively, controller 118 may be mounted elsewhere, for example on trolley 120 or at a station along the AGV track. Controller 118 typically includes a microprocessor, but may be any device that is capable of switching the control current for solenoid 116 after AGV 130 arrives at a destination. The controller may be analog or digital. If the controller is digital, its instructions may be implemented in either hardware or software. When AGV 130 arrives at station, or shortly thereafter, controller 118 switches the control current causing the engagement member 112 to move to the disengaging position.

Controller 118 is generally configured to avoid having engagement member 112 return to the engaging position prior to separation of engagement member 112 from keeper 111. In one aspect of the invention, controller 118 directs AGV 130 to pull forward prior to switching back the control current. In another aspect of the invention, the destination for the trolley is defined to be at least several feet long, as in a station area, and controller 118 maintains the control current in the switched state until the AGV pulls past the destination.

Controller 118 detects, or is notified, by a detection system when AGV 130, and any attached trolley 120, has arrived at a destination, such as a station along an AGV track. The detection system includes a sensor, which is usually contained in AGV 130. For example, controller 118 may be a controller for AGV 130 and AGV 130 may have a sensor for reading patches or other markings on an AGV track that indicate that AGV 130 has reached a station along the AGV track. Alternatively, the sensor could be mounted on trolley 120 or next to the AGV track at the destination. For example, a station along the AGV track may have an electric eye and may signal controller 118 with a radio signal when AGV 130 arrives.

AGV 130 may be of any type commonly used to transport goods from location to location within a factory, hospital, or like facility following a predetermined path, referred to herein as a track. Generally, AGV 130 is guided along the track, for example by following a wire, reflective tape, or aluminum foil. The AGV may be provided with a system for following such a track. The AGV may employ any suitable system for follow the track, such as a system providing a laser beam and detecting the beam's reflections off the track. Alternatively, the AGV may be provided with a GPS system, or similar system, and may follow a path defined in software.

Couplings, AGVs and AGV systems of the invention may be conveniently constructed by upgrading existing couplings, AGVs and AGV systems. An AGV with a manually operable coupling may be upgraded to an AGV of the invention by installing a solenoid in a position such that when energized, the solenoid moves an actuator of the coupling to an unlocking position. For example, the coupling may have for an actuator a paddle, which is a broad generally flat member that is conveniently operated by hand or by foot. The solenoid may be installed underneath the paddle, whereby the solenoid moves the paddle as though the paddle where being pressed by an operator. In this configuration, the coupling may be operated either manually or automatically.

In the upgraded AGV, if the AGV has a controller, the controller for switching the control current may be the AGV's controller. In such a case, a wire may be installed to carry the control current from the AGV to the solenoid and the current to that wire may be switched by a controller on the AGV. Alternatively, a controller and or a position sensor may be added to the AGV, as needed.

FIGS. 4a–4d illustrates a particular coupling 400 according to one aspect of the invention. Coupling 400 include frame 410, solenoid 420, actuator 430, and locking bar 450. Actuator 430 includes paddle 432, paddle axle 434, and locking cantilever 440. Paddle axle 434 pivots around paddle shaft 436 held in paddle housing 437 mounted on frame 410. Paddle spring 438 biases actuator 430 to the locking position, in which paddle 432 is up and paddle axle 432 is down. Paddle axle 432 is connected to locking cantilever 440. Locking cantilever 440 pivots about locking cantilever shaft 442 and is biased to the locking (lower) position by locking cantilever spring 444. Locking bar 450, which is the engagement member, pivots about locking bar shaft 452 and is biased by locking bar spring 454.

Coupling 400 engages with keeper 460, which includes a vertical bar. When locking bar 450 is rotated counterclockwise to what may be referred to as the disengaging position, keeper 460 may be pressed into end 412 of frame 410. As illustrated in FIGS. 5 and 6, keeper 460 causes locking bar 450 to rotate against the force of locking bar spring 450. Keeper 460 turns locking bar 450 until locking bar 450 reaches a clockwise rotated position, the engaging position, wherein keeper 460 is trapped in an interference fit formed by locking bar 450 and front end 412 of frame 410. In the engaging position, end 446 of locking cantilever 440 may engage corner 456 of locking bar 450 and thereby lock locking bar 450 in the engaging position. The lock is formed if actuator 430 is in the locking position and is released if actuator 430 is moved to the unlocking position. The engagement between locking bar 450 and locking cantilever 440 is secured by locking bar spring bar spring 454 and locking cantilever spring 444.

Coupling 400 may be disengaged by energizing solenoid 420. When energized, solenoid 420 overcomes the biasing force of paddle spring 438, lowers paddle 432 and raises paddle axle 434. This is the disengaging position. When paddle axle 434 is raised to the disengaging position, locking cantilever 440, which is connected to paddles axle 434, is also raised, causing locking cantilever 440 to disengage with locking bar 450. Once locking cantilever 440 is disengaged from locking bar 450, locking bar 450 is free to turn to the disengaging position and the keeper will pull easily away from coupling 400.

When solenoid 420 is de-energized, actuator 430 returns to the locking position. If locking bar 450 is still in the engaged position, locking bar 450 will again be locked in the engaged position. A trolley engaged to an AGV by coupling 400 must therefore be separated from the AGV before the solenoid is de-energized, if it is desired to leave the trolley behind. Separation from the trolley may be accomplished by keeping solenoid 420 energized until the AGV has pulled forward a short distance. For example, a system using coupling 400 may keep solenoid 410 energized until the AGV leaves the trolley's destination area.

Figure 7:
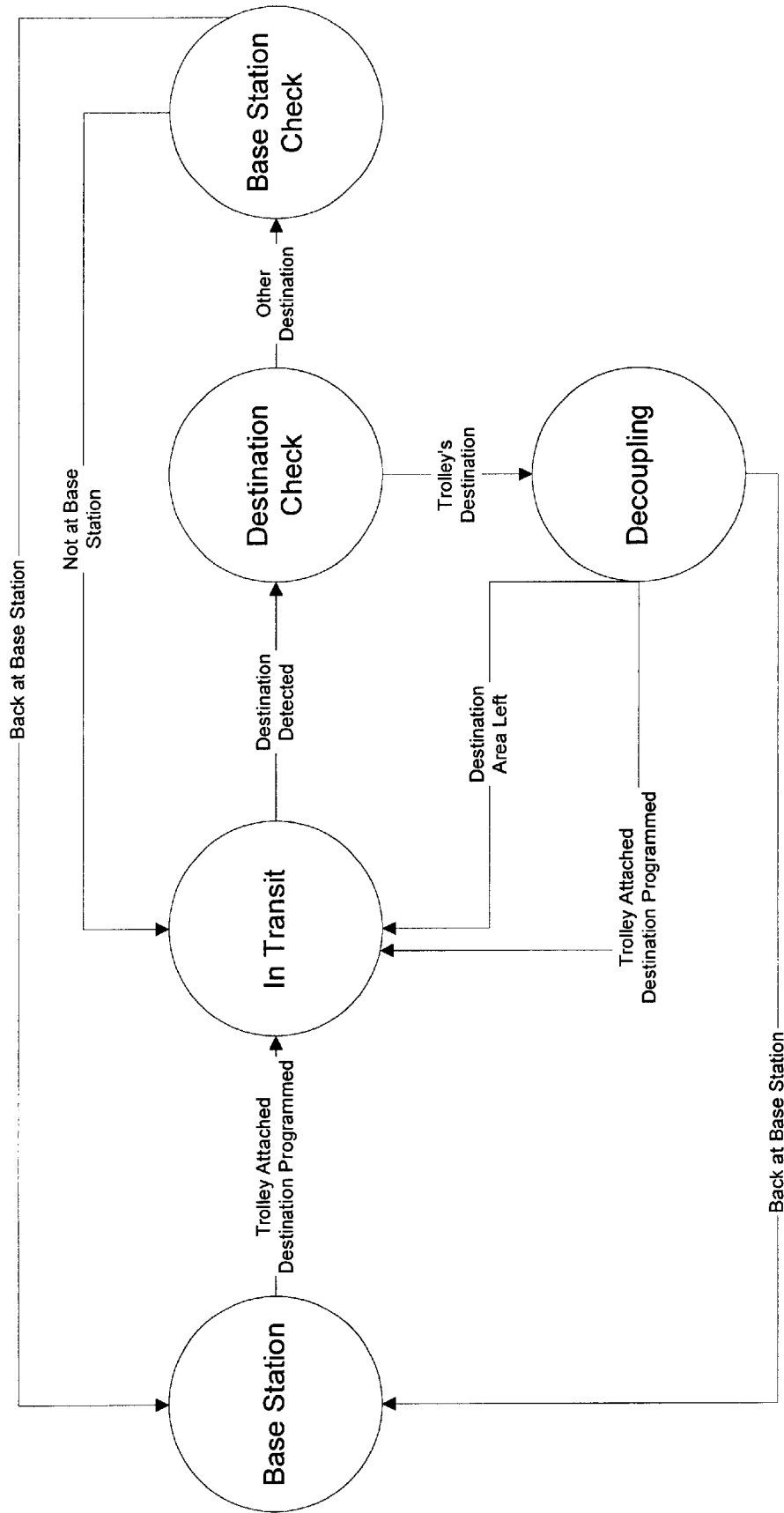
FIG. 7 is finite state machine programming diagram illustrating a method according to one aspect of the present invention.

FIG. 7 is a finite state machine programming diagram of a method of operation for an AGV according to one aspect of the present invention. Initially, the controller is in the Base Station state, the AGV is at the base station, and the control current is in what will be referred to as the un-switched state, whereby the actuator is in the locking position. After a user attaches a trolley and programs its destination, the controller moves to the In Transit state and the AGV proceeds down the track. When a destination is detected, the controller moves to the Destination Check state. If the destination is an attached trolley's destination, the controller moves to the Decoupling state. If not the controller proceeds to the Base Station Check state. If at the Base Station, the controller waits for further programming. Optionally, while in the Base Station Check state, the AGV may stop at the destination and allow time for an operator to couple a trolley and program its destination, perhaps an empty trolley to be taken to the base station.

In the Decoupling State, the AGV stops and the power to the control current is switched, whereby the actuator moves to the unlocking position. If the destination is the Base Station, the controller proceeds to the Base Station state, wherein the control current is un-switched. Optionally, before returning to the Base Station state, the AGV may pull forward slightly to uncouple the trolley. If the destination is not the base station, the control current remains switched until either the destination area has been left or an operator has attached another trolley and programmed its detination. In either case, the controller goes to the In Transit state where the control current is un-switched. The AGV may wait in the Decoupling state for a few minutes to allow time for an operator to attach a trolley and program its destination.

The base station and destination areas may be defined in any convenient manner. For example, the base station may be a storage area of a warehouse, hospital, or factory. The base station may also be a charging station for AGV's. Destinations may be, for example, a work area, another storage area, or a loading stations. The AGVs generally travel in a closed loop along a pre-programmed route, but the methods of the invention are easily adapted to allow the AGVs to be routed more dynamically.

Figure 8:
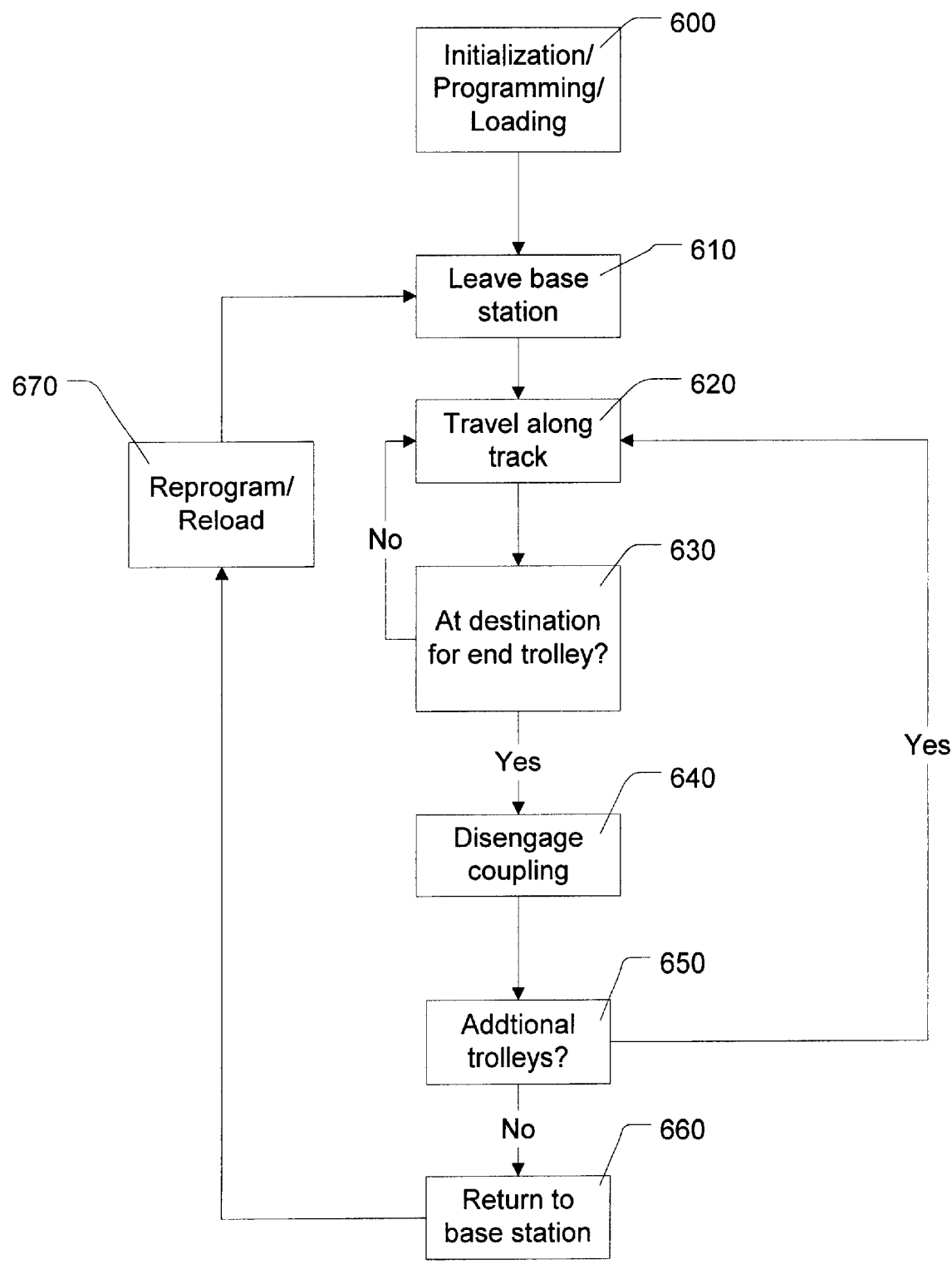
FIG. 8 is flow diagram illustrating a method according to another aspect of the present invention.

FIG. 8 is a flow diagram illustrating another methodology for carrying out the present invention that permits several trolleys having differing destinations to be pulled by one AGV. In step 600, an operator couples, with couplings of the invention, a train of trolleys to the AGV. The operator programs a controller with the trolleys' destinations and performs any other necessary initialization steps. In steps 610 the trolley leaves the base station and begins following the AGV track. In steps 620 and 630, the controller checks whether the AGV has reached the destination for the end trolley in the train. In step 640, if the AGV has reached the end trolley's destination, the AGV stops and the controller switches the appropriate solenoid to disengage the end trolley. In step 650 the controller checks whether more trolleys are attached. If so, the AGV continues down the track checking for the end trolley's destination. If not, the AGV returns to the base station and waits for reprogramming and reloading. The method is easily modified to permit additional trolleys to be added at the destination stations.

What is described above is the present invention and several of its specific aspects. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A coupling system adapted to couple an automatic guided vehicle to a trolley, comprising:

an engagement member and a keeper, the engagement member moveable between an engaging position for engaging the keeper in an interference fit and a disengaging position for releasing the keeper from the interference fit;

an actuator, which may be the same structure as the engagement member, moveable between a locking position and an unlocking position;

a solenoid acting against the actuator according to a control current; and a controller for switching the control current;

wherein switching the control current causes the actuator to move from the locking to the unlocking position;

in the locking position, the engagement member is restricted from moving from the engaging position to the disengaging position; and in the unlocking position, the engagement member is either in the disengaging position or is free to move to the disengaging position.

2. The coupling of claim 1, wherein the actuator comprises a manually operable paddle against which the solenoid acts.

3. The coupling of claim 2, wherein the solenoid is installed under the paddle and the actuator can be moved from the locking position to the unlocking position by manually pressing down on the paddle.

4. The coupling of claim 3, wherein the controller is the controller for an AGV.

5. The coupling of claim 1, wherein the controller is the controller for an AGV.

6. An automatic guided vehicle, comprising:

a body; and a coupling comprising a solenoid, the coupling being attached to the body and adapted to engage the automatic guided vehicle with a trolley;

wherein switching a control current to the solenoid permits the trolley engaged by the coupling to the automatic guided vehicle to be disengaged from the automatic guided vehicle;

wherein the coupling further comprises an actuator operatively coupled to the solenoid and an engagement member, the actuator moveable between a position for locking the engagement member in an interference fit with a keeper attached to the trolley and a position for releasing the engagement member to disengage from the keeper;

wherein the actuator comprises a paddle against which the solenoid acts.

7. The automatic guided vehicle of claim 6 further comprising a controller that switches the control current.

8. The automatic guided vehicle of claim 7 further comprising a sensor that provides the controller with an indication as to whether the automatic guided vehicle has arrived at a destination, wherein the controller switches the control current according to the indication provided by the sensor.

9. The automatic guided vehicle of claim 6, wherein the solenoid is installed under the paddle and the actuator can be move between the position for locking the engagement member in an interference fit with a keeper and the position for releasing the engagement member to disengage from the keeper by manually pressing down on the paddle.

10. A method for automatically disengaging a trolley from an automatic guided vehicle, comprising:

providing the automatic guided vehicle with a coupling and a system for automatically disengaging the coupling; and configuring the system to disengage the trolley according to a programmed location.

11. The method of claim 10, wherein the step of providing the automatic guided vehicle with a coupling and a system for automatically disengaging the coupling comprises providing the automatic guided vehicle that has a manually operable coupling and installing a solenoid on the coupling to automatically operate the coupling.

12. The method of claim 11, wherein the coupling is manually operated by pressing a paddle and the solenoid is installed so that the solenoid acts against the paddle.

13. The method of claim 11, wherein the automatic guided vehicle has a controller and the step of installing the solenoid comprises connecting the solenoid to a power source that is switched by the controller.

14. The method of claim 13, wherein configuring the controller comprises configuring the controller to switch the power to the solenoid when the automatic vehicle has arrived at a programmed location.

15. An automatic guided vehicle system, comprising:

a plurality of automatic guided vehicles;

a plurality of trolleys; and automatically operable couplings for engaging the automatic guided vehicles to the trolleys;

wherein the automatically operable couplings release the trolleys according to location of the automatic guided vehicles.

16. The automatic guided vehicle system of claim 15, wherein the automatically operable couplings release the trolleys according to programming carried by controllers on the automatic guided vehicles.

17. The automatic guided vehicle system of claim 16 further comprising a track that the automatic guided vehicle follow and the track that the automatic guided vehicle can read to determine when they have arrived at a destination, wherein the trolleys are released according to whether they are at the destination.

* * * * *